United States Patent
Gruper et al.

(10) Patent No.: US 7,047,369 B1
(45) Date of Patent: May 16, 2006

(54) SOFTWARE APPLICATION ENVIRONMENT

(75) Inventors: Shimon Gruper, Kiryat Haim (IL); Nicky Pappo, Haifa (IL); Leonid Kogan, Haifa (IL); Eyal Zohar, Kiryat Tivon (IL); Sergey Korabelnikov, Haifa (IL)

(73) Assignee: Aladdin Knowledge Systems Ltd., Tel-Aviv (IL)

( * ) Notice: Subject to any disclaimer, the term of this patent is extended or adjusted under 35 U.S.C. 154(b) by 0 days.

(21) Appl. No.: 08/937,883

(22) Filed: Sep. 25, 1997

(51) Int. Cl.
*G06F 12/00* (2006.01)
*G06F 9/46* (2006.01)

(52) U.S. Cl. .................... 711/152; 718/102; 711/100; 711/173

(58) Field of Classification Search ............... 380/4; 711/163, 152, 100, 173; 713/1–601; 717/100–178; 714/100–307; 705/50–500; 709/1–173; 718/1, 100–108
See application file for complete search history.

(56) References Cited

U.S. PATENT DOCUMENTS

| | | | | |
|---|---|---|---|---|
| 5,121,345 A | * | 6/1992 | Lentz | 713/188 |
| 5,144,660 A | * | 9/1992 | Rose | 713/200 |
| 5,278,901 A | * | 1/1994 | Shieh et al. | 713/200 |
| 5,421,006 A | * | 5/1995 | Jablon et al. | 714/36 |
| 5,440,723 A | * | 8/1995 | Arnold et al. | 714/2 |
| 5,511,184 A | * | 4/1996 | Lin | 710/261 |
| 5,684,875 A | * | 11/1997 | Ellenberger | 482/4 |
| 5,768,373 A | * | 6/1998 | Lohstroh et al. | 380/4 |
| 5,793,972 A | * | 8/1998 | Shane | 709/219 |
| 5,859,966 A | * | 1/1999 | Hayman et al. | 713/200 |
| 5,974,549 A | * | 10/1999 | Golan | 713/200 |
| 6,166,650 A | * | 12/2000 | Bruwer | 340/825.31 |
| 6,275,938 B1 | * | 8/2001 | Bond et al. | 713/200 |
| 6,351,816 B1 | * | 2/2002 | Mueller et al. | 713/201 |

FOREIGN PATENT DOCUMENTS

| | | |
|---|---|---|
| DE | 42 25 345 A1 | 2/1994 |
| FR | 2 629 231 | 9/1989 |
| JP | 8-44630 | 2/1996 |
| WO | WO 93/09498 | 5/1993 |

OTHER PUBLICATIONS

Crsobie, Mark, and Spafford, Gene, "Active Defense of a Computer System using Autonomous Agents", Feb. 15, 1995, Technical Report No. 95-008, Purdue University, pp. 1-14.*

Ilgun, Koral, and Kemmerer, Richard A., and Porras, Phillip A., "State Transition Analysis: A Rule-Based Intrusion Detection Approach", 1995, IEEE Transactions on Software Engineering, pp. 1-22.*

* cited by examiner

*Primary Examiner*—Meng-Al T. An
*Assistant Examiner*—Kenneth Tang
(74) *Attorney, Agent, or Firm*—Hoffman, Wasson & Gitler

(57) ABSTRACT

The invention contains an application operating environment in which acceptable and/or suspect activities may be defined for an application so that unacceptable application behavior can be prevented. This is done by providing a definition table identifying the types of access and actions that the application is allowed and preventing it from carrying out other types of access and actions. The definition table may be built up using a learning process during use of the application. The environment also provides a means of checking information output to a network against a list of confidential information.

19 Claims, 2 Drawing Sheets

SOFTWARE APPLICATION ENVIRONMENT

FIELD OF THE INVENTION

The present invention relates to controlling application software and more particularly but not exclusively to countermeasures that may be applied to deal with applications or applets and the like that are downloaded from other computers and from the Internet.

Note: The specification includes a microfiche appendix.

BACKGROUND OF THE INVENTION

Recent years have seen the rapid growth of the Internet. Many developments have come together to produce the Internet that we know today, and one of them is the use of applets, written in languages such as Java, which are executable programs that can be run by a web browser. In addition, faster modems have led to shorter downloading times. This has led to a growth in the downloading of programs in general directly from the Internet. The Internet is eminently suitable for such use, and one of the reasons why such use is not widespread is that people are afraid to use the Internet. This is for two main reasons. The first is that they are afraid of downloading software whose behavior is not known or that may contain viruses. The second is that they are afraid that confidential information, such as credit card numbers and the like, may somehow be made available to parties other than the intended recipients.

In regard to viruses, programs have been around for many years that detect the presence of viruses, and either delete the viruses themselves, or delete the infected file. These programs depend on recognizing specific virus programs or on recognizing strings of program code that look as though they might have the potential to carry out activities normally associated with viruses. In order to overcome the virus detection programs more recent viruses have been designed to introduce chances to themselves when they replicate so that they do not fit in with any template or pattern that the virus detector might be using. Furthermore a virus detection program has only a limited chance, of detecting a virus that was not know about when the detection program was written, especially if the way in which the virus was written is radically different from previous viruses, as occasionally happens. Furthermore virus detection programs are generally ineffective at detecting viruses that are written as macros within programs.

In any case it cannot be guaranteed that conventional countermeasures will work against all viruses, and the fear of computer viruses has been a serious impediment to the development of the Internet.

Virus detection programs also cannot detect what are known as "vandals". "Vandals" differ from viruses in that they are complete programs that are executable in themselves, as opposed to viruses, which cannot work by themselves and need to infect host programs in order to be able to replicate and cause damage. Vandals are programs that carry out activities outside the range of expectations of the user. For example they may damage or delete other files or interfere with the operation of other programs. Internet style applets make ideal vandals as they can often be downloaded from the internet through one's web browser without the user even being aware of its a presence.

The theft of confidential information is another task that vandals can carry out. The vandal applet is downloaded from the internet without the knowledge of the user and begins to scan the disk for the confidential information, or wait for the user to enter such information for some other purpose. It then passes the information to a specific site at some time that the user is connected to the Internet, again without the user being aware that anything untoward has occurred.

The reason that anti-virus programs have difficulty in detecting vandal programs is that they are not viruses and indeed lack many of the fundamental features of viruses, that is to say they do not replicate and they do not modify existing files as they infect them. Furthermore the preparation of a reliable anti-vandal program is problematic because it is difficult to lay down precise criteria to enable a computer program to distinguish between a wanted applet and a vandal.

SUMMARY OF THE INVENTION

It is an object of the present invention to improve the confidence of the user in the Internet. Ideally confidence should be raised sufficiently that users are happy to use the internet for business purposes.

According to a first aspect of the present invention there is provided apparatus for ensuring the integrity of computer applications to be run in association with a computer having data storage arranged sectorwise in a storage device, comprising an identifier for identifying an application to be run, a listing associated with at least one of the applications to be run, the listing identifying different sectors of the storage device and associating with each identified sector an access level required by the application, and an enforcement device, for prohibiting the at least one application from accessing an identified sector of the storage device at any level higher than the associated required access level.

According to a second aspect of the invention there is provided apparatus for ensuring the integrity of computer applications to be run in association with a computer having data storage arranged sectorwise in a storage device. The Apparatus comprises an identifier for identifying an application to be run, a listing associated with at least one of the applications to be run, the listing identifying different sectors of the storage device and associating with each identified sector an access level, an enforcement device, for preventing the at least one application from accessing an identified sector of the storage device at any level higher than the associated access level, and a query device, for identifying when an attempt to access a sector of the storage device has been prevented by the enforcement device, querying the attempt with the user, or against a predefined configuration, and if found acceptable then including the higher level of access in the listing.

In embodiments the step of querying may only be carried out for a limited period of time. This may be literally a predetermined time from installation of any given program or it may be a predetermined time measured only whilst the new program is running. Alternatively a program may be run in this learning mode until the next occasion upon which the computer is reset. Then again in one embodiment a predetermined number of operations of the new program is counted through, and once that number is reached learning mode is ended. Other forms of limitation of the learning mode will suggest themselves to the skilled person and all of these are viable alternatives that could provide useful embodiments of the invention. As an alternative it is possible not to set a limit on the length of the learning mode.

According to a third aspect of the present invention there is provided apparatus for ensuring the integrity of computer applications to be run in association with a computer having data storage arranged sectorwise in a storage device, comprising an identifier for identifying at least one application to be run, the at least one application being adapted to call at least one other application to run, a listing associated with at least one of the applications to be run, the listing identifying different sectors of the storage device and associating with each identified sector an access level required by the application, an enforcement device, for prohibiting the at least one application from accessing an identified sector of the storage device at any level higher than the associated required access level, and wherein the identifier is adapted firstly to identify a listing associated with the at least one other application for use with the enforcement device, and if such a listing cannot be found then identifying a listing associated with the at least one application for use with the enforcement device.

According to a fourth aspect of the present invention there is provided a computer connected to a network, the computer comprising a storage device for storing data, a transmission device for sending data from the computer to the network, a listing of controlled data which should not be sent to the network, a comparison device adapted to compare data sent to the transmission device with the controlled data, and a prevention device for preventing data corresponding to the controlled data being sent automatically to the network.

In embodiments, any of the above aspects may be combined with apparatus for downloading data from identifiable sites in a network to a computer the data may comprise a plurality of types of data including executable program data, The apparatus comprises a list of known sites, checking means for comparing a source of any downloaded material with said list, and prevention means, for preventing execution of executable program data that does not come from a site on the list, or alternatively that does come from said list. In embodiments, means may be provided for modifying the list.

Embodiments may further comprise override means adapted to allow an operator to override the enforcement or prevention devices.

Embodiments of the invention may comprise any combination of the above five aspects.

It is noted that throughout the specification and claims the term "data" includes, but is not limited to, any information or executable instructions. It is further noted that throughout the specification and claims the terms "sector" and "sectorwise" may refer to physical locations or logical locations such as directories. It is further noted that throughout the specification and claims the term "storage" may refer to either volatile or non-volatile storage.

BRIEF DESCRIPTION OF THE DRAWINGS

For a better understanding of the invention and to show how the same may be carried into effect, reference will now be made, purely by way of example, to the accompanying drawings in which.

Attached herewith is a microfiche appendix comprising Appendix A which aids in the understanding and appreciation of one preferred embodiment of the invention shown and described herein. Appendix A represents a computer listing of a preferred software embodiment of the present invention.

DESCRIPTION OF THE PREFERRED EMBODIMENTS

Figure 1:
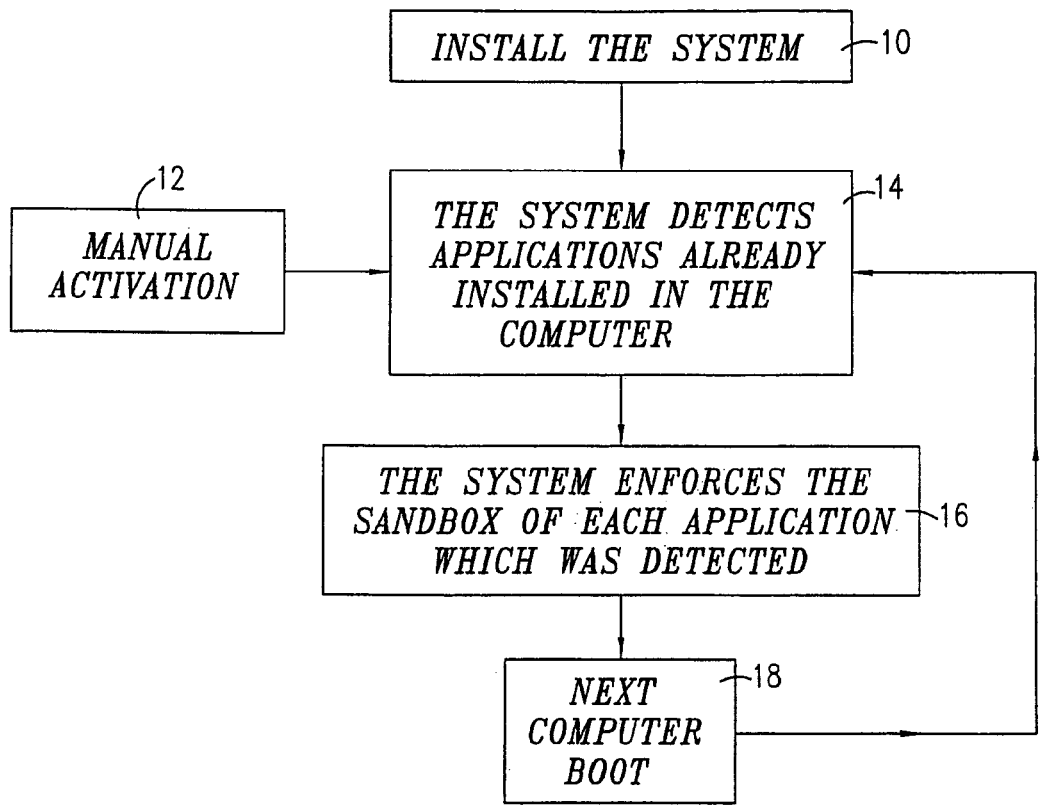
FIG. 1 is a flow chart of the operation of a first embodiment of the invention.

FIG. 1 is a flow chart of a first embodiment of the present invention which is operable to control application software. A computer may have numerous applications which can be run, some being widely available computer programs whose behavior is well documented, and some may be customized software whose behavior is not well understood or which has not been well tested. Some of these applications may have been downloaded from unreliable sources and some may be present without the knowledge of the user. In some cases the programs may be "vandal" programs of the type discussed above. Vandal programs are for example rogue applets that attempt to access areas of the hard drive where damage can be done and where applets in general would not normally need to have access.

The present invention is thus operable to provide sets of parameters in which each individual program is allowed to operate. In order to determine whether a particular application is operating normally, embodiments of the present invention use, or create and use, a listing of activities that the application may wish to carry out. This listing is alternatively referred to herein as the application's predefined set. The activities are either permitted or forbidden, depending on whether they are part of the predefined set. The listing may be used to validate operations that the program tries to carry out. If the operation is not one that the listing permits then either the user is alerted to give specific permission or the operation is stopped altogether.

The listing used need not be an exhaustive listing of the operation of the program. It only need list those operations that are relevant to suspect or forbidden activity, which would typically involve attempts to access different parts of the system hard drive and write or delete data from the area accessed, or execute programs located within the area accessed. Table 1 below is a listing of levels of access that a typical application program might be given, to different parts of the system hard drive. The table is drawn up for Netscape Navigator, operating under the Windows operating system. This is a program which requires a relatively high level of access to different areas of the system hard drive. Nevertheless its profile is readily distinguishable from that of most suspect or forbidden activity. It will be apparent that the predefined set is a list of directories on the system hard drive, and associated with each such directory is a list of access levels that may be allowed with that directory.

TABLE 1

Predefined set for Netscape Navigator

| Directory/location | Level of Authorization |
| --- | --- |
| Windows Path | Read write create execute delete |
| Windows/command path | read create execute |
| Environment Variable: Temp Tmp | Read write create execute delete |
| Environment Variable: Path | Read create execute |
| Product Path | Read write create execute delete |
| Product/Data Path | Read write create |
| WindowsPath/Sysbckup | Read write create execute delete |
| WindowsPath/help | Read write create execute |
| Recycle Bin directories | Read write create execute delete |
| Application path | Read write create execute delete |
| Application cache | Read write create execute delete |
| WindowsPath/fonts | Read write create execute |

An enforcement file is drawn up using a table such as table 1. When the application is run, disk access requests may be checked against the enforcement file. If the type of disk access is not allowed by the enforcement file then either the operation is stopped, the user is prompted to give specific permission, or a pre-defined automatic response may occur. The enforcement file may be automatically updated based on the nature of the application's request and the subsequent response.

It is possible to draw up a series of enforcement files for popular products and to ship them as part of a package incorporating an embodiment of the invention. The package may then identify the installed products as part of, or following, a booting operation of the computer. The relevant enforcement file may then be called up as the products are run Searching for a given application may be carried out by looking in the system registry. Alternatively it may be necessary to make a more general search of the hard drive, as is well known to those skilled in the art.

Instead of carrying out a product identification operation association with booting of the computer, it may be carried out following given events such as installing a new product or upon finishing an Internet session, with an appropriate predefined set selected for each application identified.

Alternatively the user may not wish to have the invention operating on his computer at all times. Manual activation may thus be provided. The general operation of this embodiment is as shown in FIG. 1 which is a flow diagram showing how an embodiment may be installed on a computer 10, may be manually activated 12, or may automatically be led to detect installed software 14 and may see that the details of the enforcement file, or sandbox, are adhered to 16. At the next computer boot 18 the embodiment returns to the detection step 14.

Figure 2:
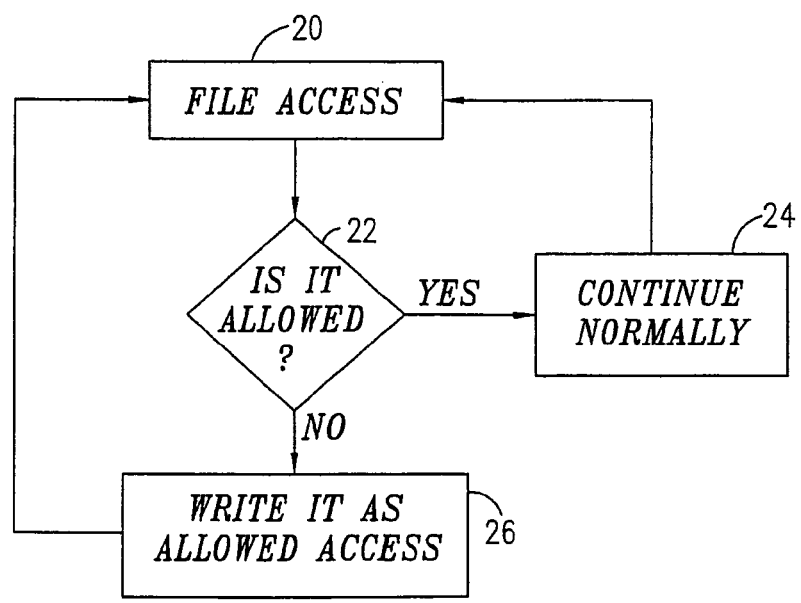
FIG. 2 is a flow chart of the operation of a second embodiment of the invention.

In the event that an enforcement file is not available, an embodiment of the invention, whose flow diagram is shown in FIG. 2, has a so-called learn mode 21. In this mode a new program is assigned a general enforcement file. The general enforcement file gives the program no access rights at all to files on the system disk. The program then attempts to make a file access 20. Provided the attempt is within certain parameters the system allows the attempt and learns the details 23 so that in future an access to that area of the disk will always be allowed. Thus a specific enforcement file is gradually built up over the duration of the learn mode. The specific enforcement file is then consulted 22, in future access attempts, to decide whether the program has rights to access the required part of the system disk at the required level. If the answer is yes the program continues in the normal way, 24. However, as the program attempts to access areas to which it does not have rights, 26, the user is prompted to give specific permission. The user may grant the level of access for the specific session only or he may grant it permanently. Alternatively an automatic learn mode may be configured, in which any but the most drastic levels of access are granted to the program. Learn mode may be set up only for a specific session or the user may wish to have the program run continuously in learn mode. A specific enforcement file is built up, as mentioned above, based on the instances of specific permission being given, and the profile of the new application is thus gradually learnt. It will be appreciated that the automatic version of learn mode is best run only for specific sessions, otherwise no real program profile is enforced.

Figure 3:
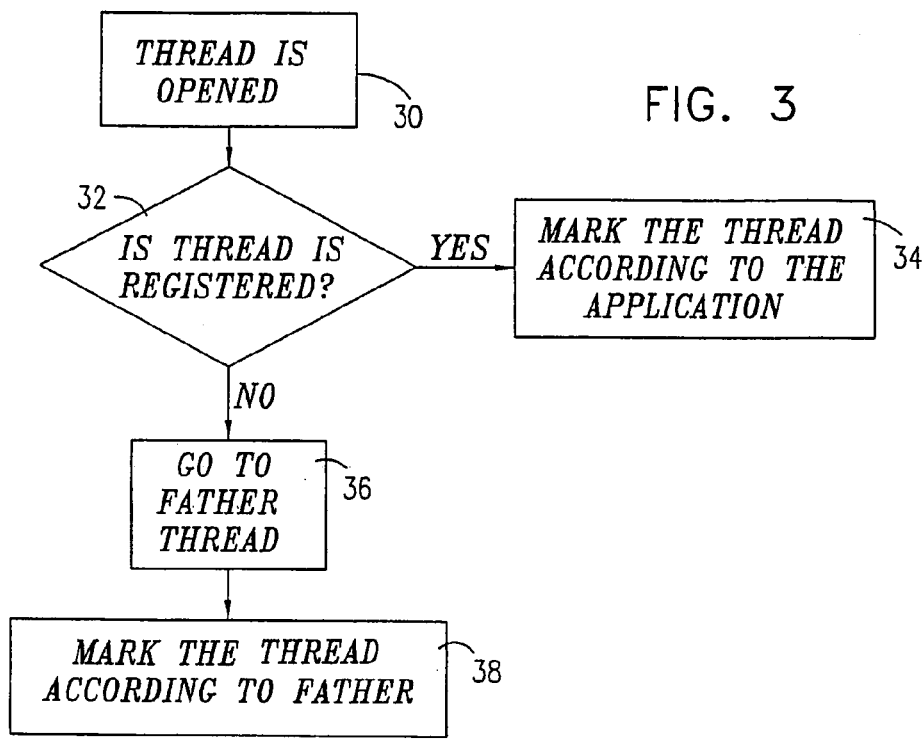
FIG. 3 is a flow chart of the operation of a third embodiment of the invention.

The use of profiles to spot vandal activity depends on knowing exactly which program is running at any one time. But many programs are able to call up other programs (daughter applications) as part of their own operation. The embodiment of the invention shown in FIG. 3 therefore keeps track of the hierarchy of programs which are operating. The hierarchy, or thread, is first detected, 30. The embodiment checks to see if the thread itself is registered, 32. If the daughter application has its own enforcement file then that is used, 34. If it does not then the thread is assigned the enforcement file of the parent application, 36. This is then modified in exactly the same way as the general enforcement file of a new application 38.

An example of the kind of hierarchy involved in the above is a web browser such as Netscape calling up an audio player such as Real Audio to play a sound file, a task that it is not able to carry out itself Although Real Audio is a self-contained application with its own enforcement file, it will not obtain the rights of its own enforcement file but rather those of the web browser that called it.

A further problem with the Internet environment is that applets can be written to download from the Internet without the knowledge of the user when for example accessing a particular website. The applets scan the disk for confidential information such as credit card numbers, or wait for the user to enter such information for some other purpose, and then they pass the information to a specific site at some time that the owner is connected to the Internet, again without the user being aware that anything untoward has occurred.

Figure 4:
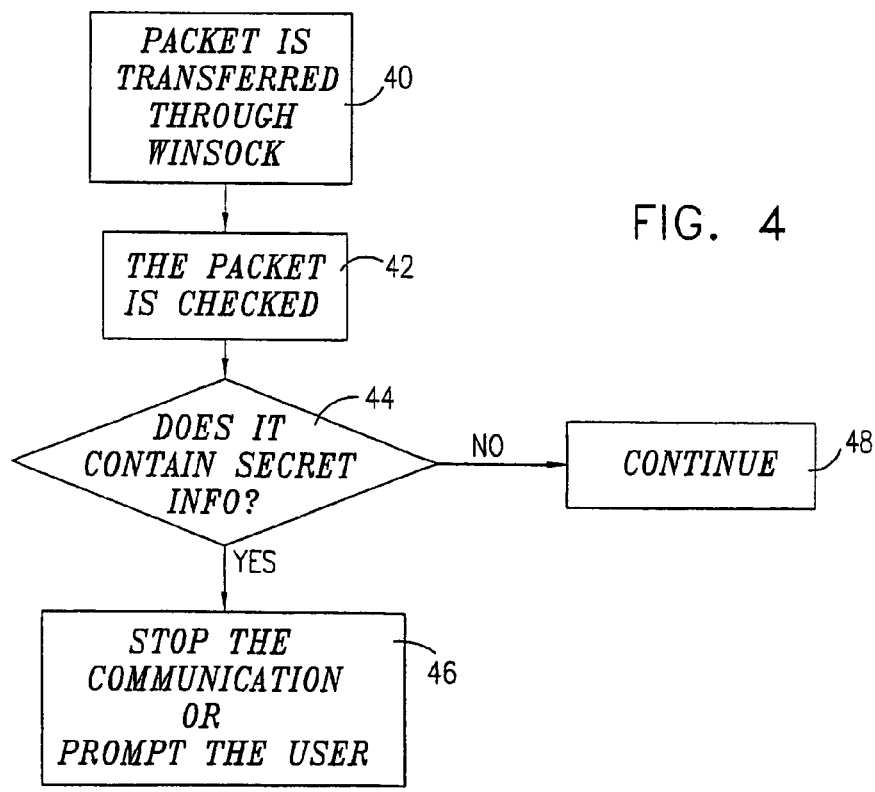
FIG. 4 is a flow chart of the operation of a fourth embodiment of the invention.

The present invention deals with this problem by providing an embodiment, a flow diagram of which is shown in FIG. 4, which examines every data packet that is sent out from the computer against a database of confidential information. The computer is assumed to use a standard Internet protocol package which arranges all of the data to be sent out in the form of data packets, 40. The embodiment checks each packet as it goes out, 42. If the data packet is found to contain a match with any of the errors in the database, 44, then the application is stopped, either permanently or until the user responds to a prompt. If the packet is not determined to have confidential information then of course the communication is allowed to continue. Obtaining the contents of data packets before they are sent out of the computer using some form of Internet Protocol, is a problem that is easily solved by the skilled man. In a more advanced embodiment data packets coming into the computer are all also read to check for the same confidential information as such would indicate that the data has already escaped from the computer. In some cases the earlier embodiments of the invention can also be relied upon to prevent such rogue applets from working when they try to read parts of the system hard drive that the program within which they are operating does not have access rights.

A preferred method for constructing a three-dimensional terrain rendering system operative in accordance with a preferred embodiment of the present invention is now described:

a) Provide a computer terminal, such as an Intel-based Pentium 166 Mhz computer, configured with the Microsoft Windows 95 operating system;

b) Generate SETUP.EXE and associated binary files from the hexadecimal computer listing of Appendix A;

c) Load the files generated in step b) into a directory of the computer terminal provided in step a) and execute SETUP.EXE.

It is appreciated that the particular embodiment described in Appendix A is intended only to provide an extremely detailed disclosure of the present invention and is not intended to be limiting.

It is appreciated that any of the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. Apparatus for ensuring the integrity of an application executed on a computer having data storage arranged sectorwise, comprising:
   apparatus for learning about permitted access behavior of said application to said data storage arranged sectorwise by monitoring accesses of said application to sectors of said data storage during a limited learning period in which said application is assumed to be uninfected by a virus; and
   an enforcement device, operative after said limited learning period is over, for identifying and preventing said application from accessing sectors elements of data storage that do not correspond with the permitted access behavior of said application.

2. Apparatus according to claim 1 wherein said enforcement device is operative to prompt a user to give specific permission, upon occurrence of an attempt of said application to access sectors of data storage not accessed during said limited learning period.

3. The apparatus of claim 1, wherein only permitted accesses of said application to sectors of said data storage are monitored during said limited learning period.

4. Apparatus according to claim 1 wherein said data storage arranged sectorwise is selected from a group consisting of a path and a file.

5. A method for detecting forbidden behavior of a first application executed on a computer system, and preventing damage thereupon, comprising:
   monitoring accesses of said first application to sectors of data storage arranged sectorwise in a storage device over a limited learning period, in which said first application is assumed to be uninfected by a virus, and storing data storage access permission information about said accesses in an enforcement file, thereby learning permitted access behavior of said application; and
   when said limited learning period is over, detecting attempts of said application to access sectors of data storage that do not correspond to said permitted access behavior as determined by said enforcement file and inhibiting said attempts, thereby preventing damage thereupon.

6. A method according to claim 5, further comprising enabling a user of said first application to determine said permitted access behavior during said limited learning period.

7. A method according to claim 6, further comprising enabling the user of said first application to determine said permitted access behavior after said limited learning period is over.

8. A method according to claim 6, further comprising detecting attempts of a child application of said first application to access sectors of data storage that do not correspond to said permitted access behavior as determined by said enforcement file and inhibiting said attempts, thereby preventing damage thereupon.

9. A method according to claim 6, further comprising detecting attempts of a second application to access sectors of data storage that do not correspond to said permitted access behavior as determined by said enforcement file and inhibiting said attempts, thereby preventing damage thereupon.

10. A method according to claim 5, further comprising enabling a user of said first application to determine said permitted access behavior after said limited learning period is over.

11. A method according to claim 10, further comprising detecting attempts of a child application of said first application to access sectors of data storage that do not correspond to said permitted access behavior as determined by said enforcement file and inhibiting said attempts, thereby preventing damage thereupon.

12. A method according to claim 10, further comprising detecting attempts of a second application to access sectors of data storage that do not correspond to said permitted access behavior as determined by said enforcement file and inhibiting said attempts, thereby preventing damage thereupon.

13. A method according to claim 5, further comprising detecting attempts of a child application of said first application to access sectors of data storage that do not correspond to said permitted access behavior as determined by said enforcement file and inhibiting said attempts, thereby preventing damage thereupon.

14. A method according to claim 5, further comprising detecting attempts of a second application to access sectors of data storage that do not correspond to said permitted access behavior as determined by said enforcement file and inhibiting said attempts, thereby preventing damage thereupon.

15. A method according to claim 14, wherein said second application is executed on a second computer.

16. A method according to claim 5, wherein said monitoring accesses of said first application to sectors of data storage learns only the permitted access behavior of said first application.

17. A method according to claim 5, wherein said data storage arranged sectorwise is selected from a group consisting of a path and a file.

18. A method for blocking forbidden access behavior of a program, the method comprising the steps of:
   providing a list of access permissions of said program to sectors of data storage, whereby access of said program to sectors of data storage not on said list are forbidden accesses;
   monitoring access requests of said program to data storage;
   upon indicating a request to access a sector of data storage which does not comply with said list, blocking said request;
   during a limited learning period in which said program is assumed to be uninfected by a virus, upon indicating by said monitoring a request to access a sector of data storage which is not on said list, adding said sector to said list as allowable for access.

19. A method according to claim 18, wherein said monitoring further includes requests of a child application of said program to access data storage.

* * * * *